(12) United States Patent
Zhu et al.

(10) Patent No.: US 8,287,058 B2
(45) Date of Patent: Oct. 16, 2012

(54) COMPUTER CASE

(75) Inventors: Chong-Xing Zhu, Taipei Hsien (CN); Hung-Ming Chang, Taipei Hsien (TW)

(73) Assignee: Wistron Corp., New Taipei (TW)

( * ) Notice: Subject to any disclaimer, the term of this patent is extended or adjusted under 35 U.S.C. 154(b) by 178 days.

(21) Appl. No.: 12/836,588

(22) Filed: Jul. 15, 2010

(65) Prior Publication Data

US 2011/0273068 A1 Nov. 10, 2011

(30) Foreign Application Priority Data

May 4, 2010 (TW) .............................. 99114262 A (51) Int. Cl.
*A47B 81/00* (2006.01)

(52) U.S. Cl. .................................. 312/223.2; 312/319.1

(58) Field of Classification Search ............... 312/223.2, 312/319.1–319.2; 361/679.33
See application file for complete search history.

(56) References Cited

U.S. PATENT DOCUMENTS

| 4,979,909 | A * | 12/1990 | Andrews ........................ 439/352 |
| 6,654,240 | B1 * | 11/2003 | Tseng et al. .............. 361/679.33 |
| 7,384,106 | B2 * | 6/2008 | Lan ............................ 312/223.2 |
| 7,495,909 | B1 * | 2/2009 | Chen et al. ............... 361/679.37 |
| 7,806,489 | B2 * | 10/2010 | Selvidge et al. .............. 312/222 |
| 7,826,209 | B2 * | 11/2010 | Chen et al. ............... 361/679.37 |
| 7,830,654 | B2 * | 11/2010 | Hsieh et al. .............. 361/679.33 |
| 7,969,724 | B2 * | 6/2011 | Chen et al. ............... 361/679.33 |
| 8,061,535 | B2 * | 11/2011 | Cheng-Yuan et al. .......... 211/26 |
| 8,072,745 | B2 * | 12/2011 | Chen et al. ............... 361/679.33 |
| 8,132,869 | B2 * | 3/2012 | Wang et al. ................. 312/223.2 |
| 2007/0138921 | A1 * | 6/2007 | Peng et al. ..................... 312/9.3 |
| 2009/0189042 | A1 * | 7/2009 | Chen et al. .................. 248/309.1 |

FOREIGN PATENT DOCUMENTS

| CN | 2585533 Y | 11/2003 |
| CN | 2627794 Y | 7/2004 |
| TW | 577576 | * 2/2004 |

* cited by examiner

*Primary Examiner* — Hanh V Tran
(74) *Attorney, Agent, or Firm* — CKC & Partners Co., Ltd.

(57) ABSTRACT

A computer case includes a first fixing board, a second fixing board and a fixing module. The first fixing board and the second fixing board form a space for inserting a removable device. The second fixing board includes a hole. When the removable device is inserted into the space, the hole of the second fixing board can be aligned with a fixing aperture of the removable device. The fixing module includes a U-shaped spring and a spring holder. A fixing segment is disposed at one end of the U-shaped spring. When the U-shaped spring is placed in a spring trough of the spring holder and the fixing module is fixed on the second fixing board, the fixing segment is moved with the rotating of the U-shaped spring in the spring trough to be inserted into or removed from the fixing aperture of the removable device.

10 Claims, 7 Drawing Sheets

COMPUTER CASE

RELATED APPLICATIONS

This application claims priority to Taiwan Application Serial Number 99114262, filed May 4, 2010, which is herein incorporated by reference.

BACKGROUND

1. Technical Field

The present invention relates to a computer case. More particularly, the present invention relates to a computer case which a removable device can be inserted into or removed from without any tools.

2. Description of Related Art

As technology develops, computer products are widely spread and there are more and more computer applications. To make computers able to satisfy different needs, spaces for placing different external removable devices, such as optical disk drive, hard disk drives, floppy disk drive or any other external devices, are designed in computer cases. In general, there may be a fixing structure to fix the removable device in the space of the computer case.

In the prior art, removable devices are fixed in computer cases utilizing screws. Therefore, tools, such as screwdrivers or other tools, are needed to fix or remove the removable devices. However, it is inconvenient to fix or remove the removable devices without any tools.

Above all, it is an important issue to design a computer case which removable devices can be fixed or removed from without any tools.

SUMMARY

According to one embodiment of this invention, a computer case is provided. The computer case includes a first fixing board, a second fixing board and a fixing module. A space for inserting a removable device is formed by the first fixing board and the second fixing board. The removable device includes a fixing aperture. The second fixing board includes a hole. The hole of the second fixing board can be aligned with the fixing aperture of the removable device when the removable device is inserted into the space. The fixing module includes a U-shaped spring and a spring holder. A fixing segment is disposed at one end of the U-shaped spring. The spring holder includes a spring trough. The fixing segment can be moved with rotating of the U-shaped spring in the spring trough to be inserted into or removed from the fixing aperture of the removable device through the hole when the U-shaped spring is placed in the spring trough of the spring holder and the fixing module is fixed on the second fixing board.

Above all, a removable device can be fixed by inserting the fixing segment of the U-shaped spring into the fixing aperture of the removable device through the hole of the fixing board. In addition, the removable device can be removed by removing the fixing segment of the U-shaped spring from the fixing aperture of the removable device through the hole of the fixing board. Therefore, the removable device can be fixed or removed without any tool. Besides, the spring holder can be removed after the positioning emboss of the spring holder is pulled out of the positioning trough of the fixing board. Hence, the spring holder can be fixed or removed without any tools.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
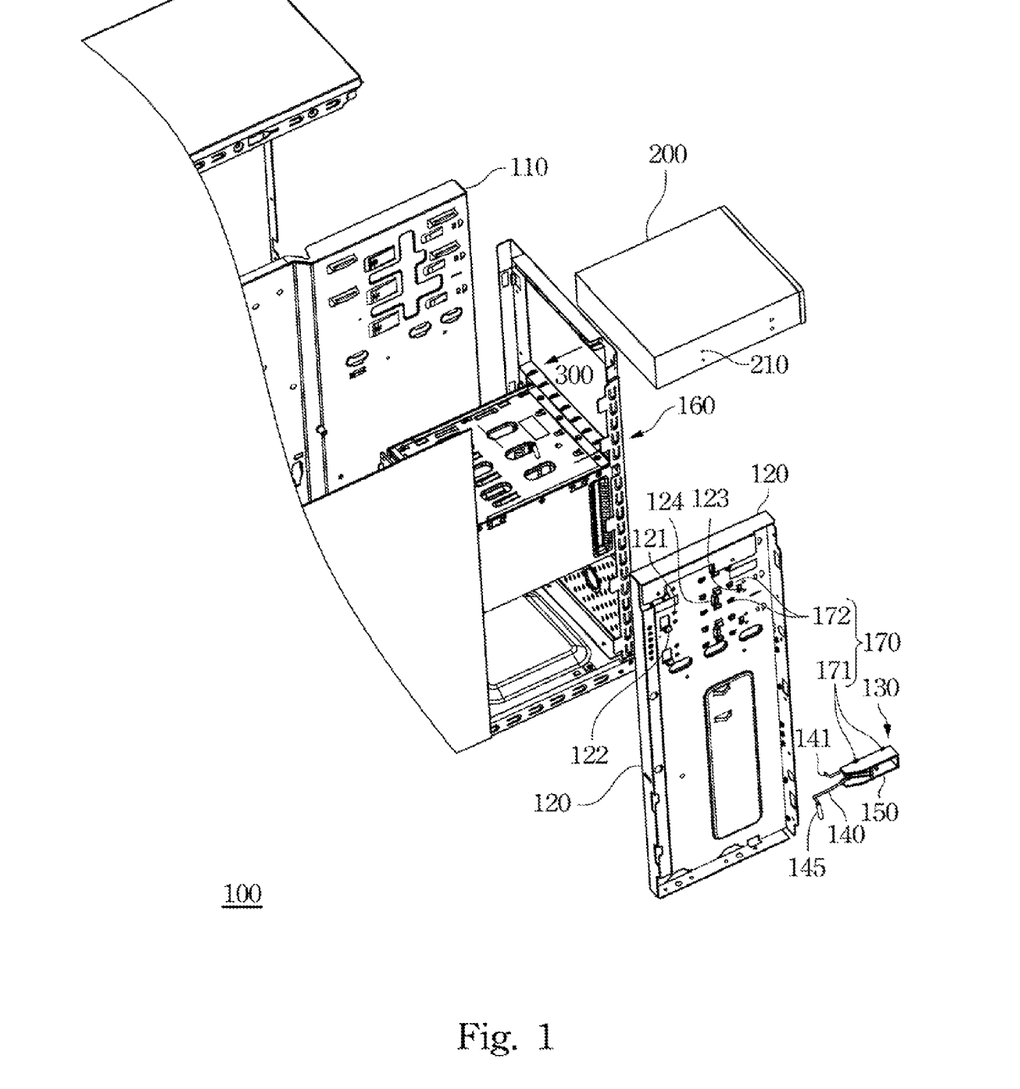
FIG. 1 is an exploded view of a computer case according to one embodiment of this invention.

FIG. 1 is an exploded view of a computer case according to one embodiment of this invention. The computer case provides a space for a removable device, and the removable device can be inserted into or removed from the space in the computer case without any tools.

The computer case 100 includes a first fixing board 110, a second fixing board 120 and a fixing module 130. The fixing module 130 includes a U-shaped spring 140 and a spring holder 150. The first fixing board 110 and the second fixing board 120 form a space 160 for inserting a removable device 200. The removable device 200 may be an optical disk drive, a hard disk, a floppy disk drive or any other removable device. The removable device 200 includes a fixing aperture 210. The second fixing board 120 includes a hole 121. When the removable device 200 is inserted into the space 160 along the direction of arrow 300, the hole 121 of the second fixing board 120 can be aligned with the fixing aperture 210 of the removable device 200.

Figure 2:
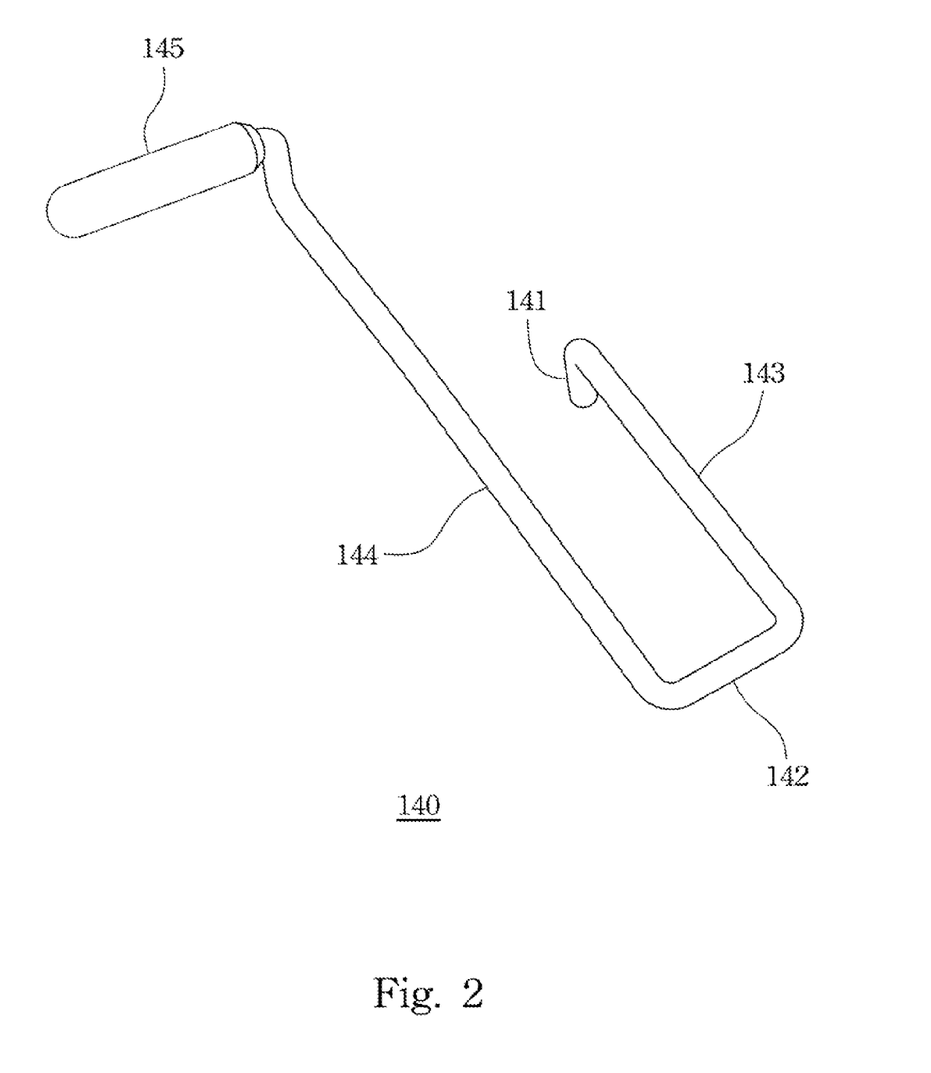
FIG. 2 is an embodiment of the U-shaped spring 140 in FIG. 1.

FIG. 2 is an embodiment of the U-shaped spring 140 in FIG. 1. A fixing segment 141 is disposed at one end of the U-shaped spring 140. The U-shaped spring 140 may include an axle segment 142, a first side segment 143 and a second side segment 144. The first side segment 143 and the second side segment 144 are disposed at two sides of the axle segment 142. The fixing segment 141 is disposed at the end of the first side segment 143.

Figure 3:
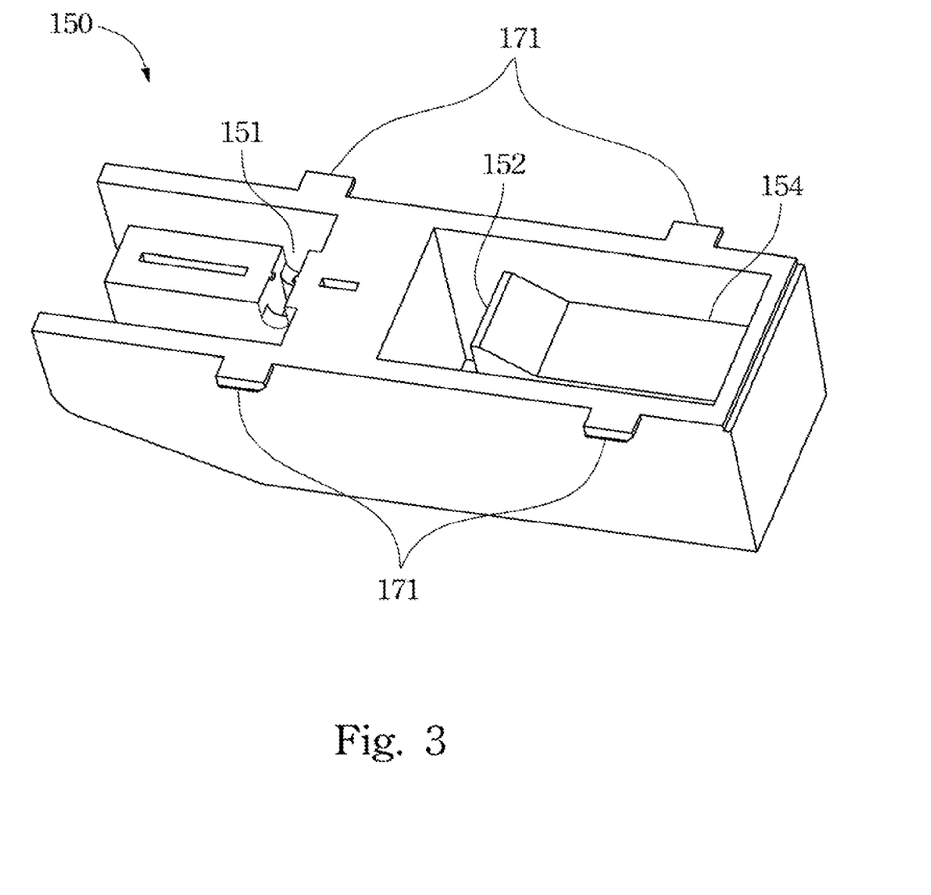
FIG. 3 is a bottom view of the spring holder 150 in FIG. 1.

FIG. 3 is a bottom view of the spring holder 150 in FIG. 1. The spring holder 150 includes a spring trough 151. Hence, the axle segment 142 of the U-shaped spring 140 can be put in the spring trough 151 to form the fixing module 130.

Figure 4:
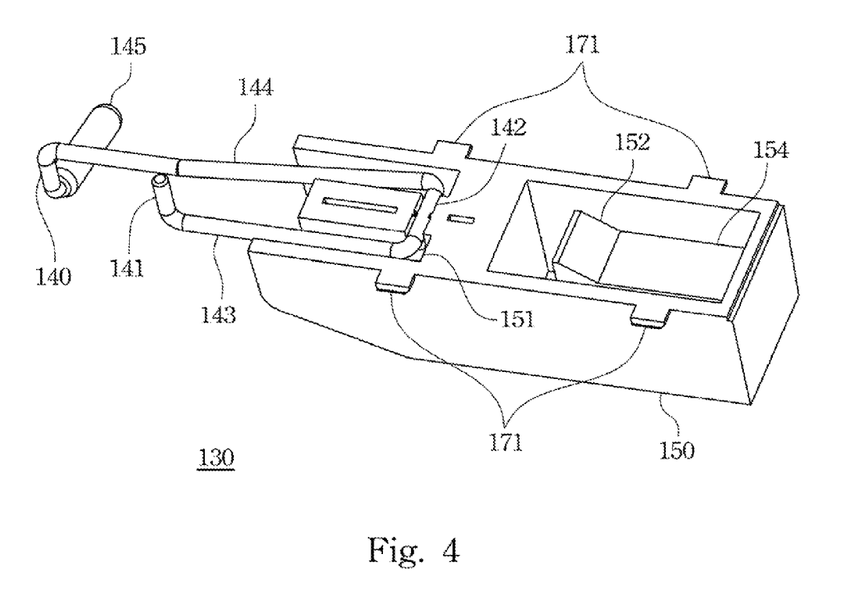
FIG. 4 is a bottom view of the fixing module 130 in FIG. 1.

FIG. 4 is a bottom view of the fixing module 130 in FIG. 1. When the axle segment 142 of the U-shaped spring 140 is put in the spring trough 151, the to fixing segment 141 is moved with the rotation of the axle segment 142 in the spring trough 151. The other end of the U-shaped 140 opposite to the fixing segment 141, which is so called the end of the second side segment 144, includes a handle segment 145. Hence, the axle segment 142 can be rotated with the movement of the handle segment 145. Therefore, users can drive the axle segment 142 to rotate in the spring trough 151 through the handle segment 145, which makes the fixing segment 141 move.

Figure 5:
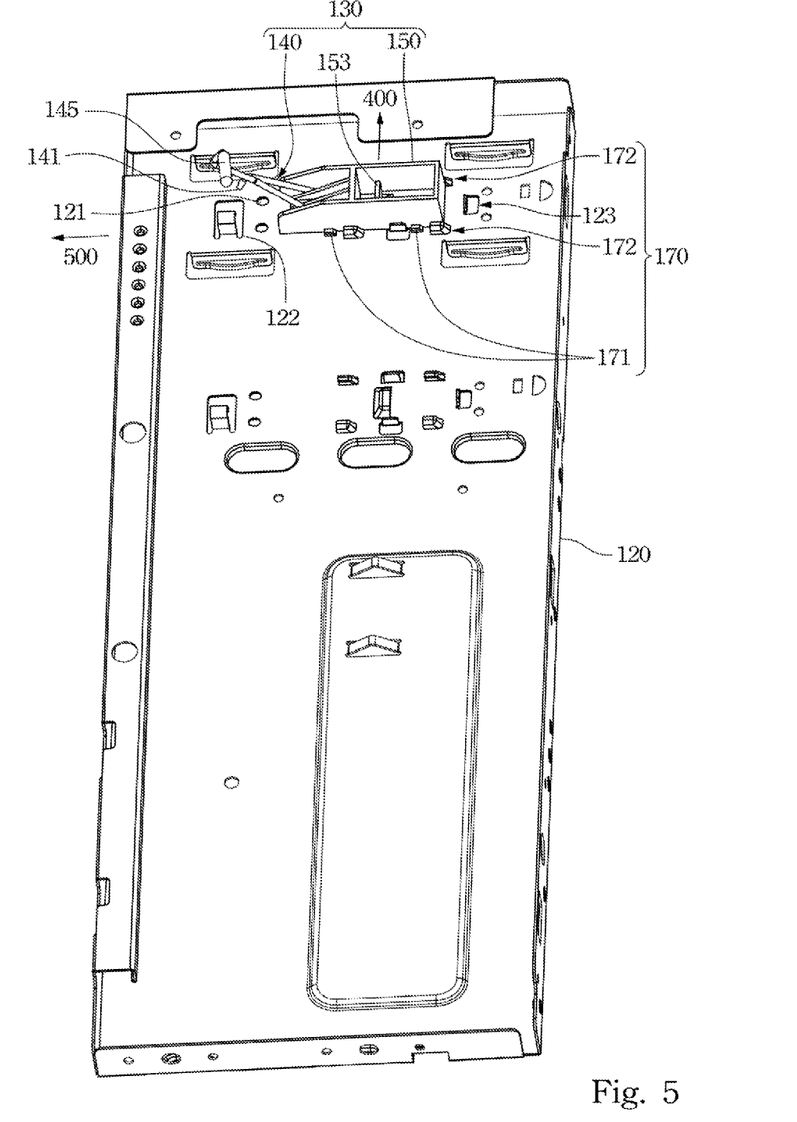
FIG. 5 illustrates one embodiment that the fixing module 130 is fixed on the second fixing board 120.

FIG. 5 illustrates one embodiment that the fixing module 130 is fixed on the second fixing board 120. Refer to FIG. 1, FIG. 4 and FIG. 5. When the axle segment 142 of the U-shaped spring 140 is placed in the spring trough 151 and the fixing module 130 is fixed on the second fixing board 120, the fixing segment 141 can be moved with rotating of the axle segment 142, such that the fixing segment 141 can be inserted into or removed from the fixing aperture 210 of the removable device 200 through the hole 121. When the fixing segment 141 is inserted into the fixing aperture 210 of the removable device 200 through the hole 121, the removable device 200 is fixed. When the fixing segment 141 is removed from the fixing aperture 210 of the removable device 200 through the hole 121, the removable device 200 can be removed. In addition, the second fixing board 120 may include a fixing portion 122 to fix the U-shaped spring 140 after the fixing segment 141 inserted into the fixing aperture 210 of the removable device 200 through the hole 121.

Figure 6:
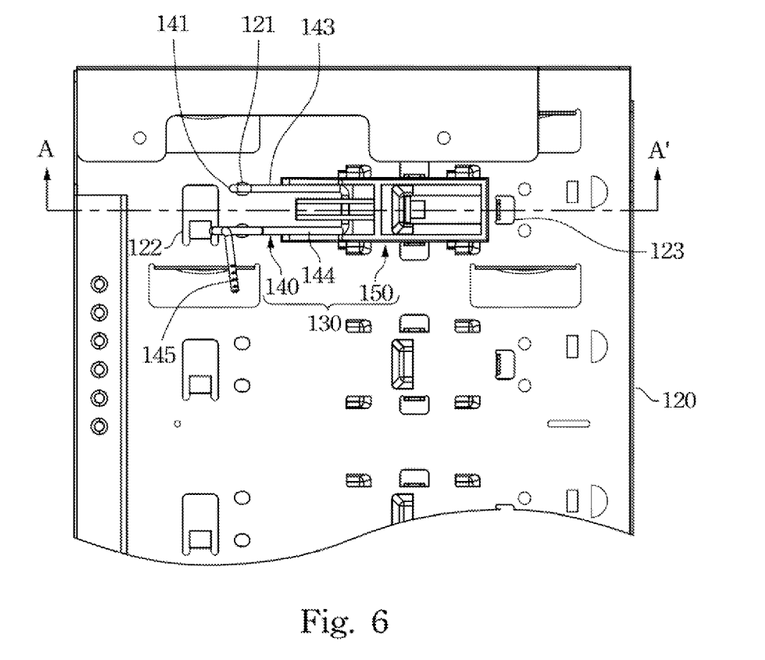
FIG. 6 illustrates a top view which shows that the fixing module 130 is fixed on the second fixing board 120 and the fixing segment 141 is inserted through the hole 121 according to one embodiment of this invention.
Figure 7:
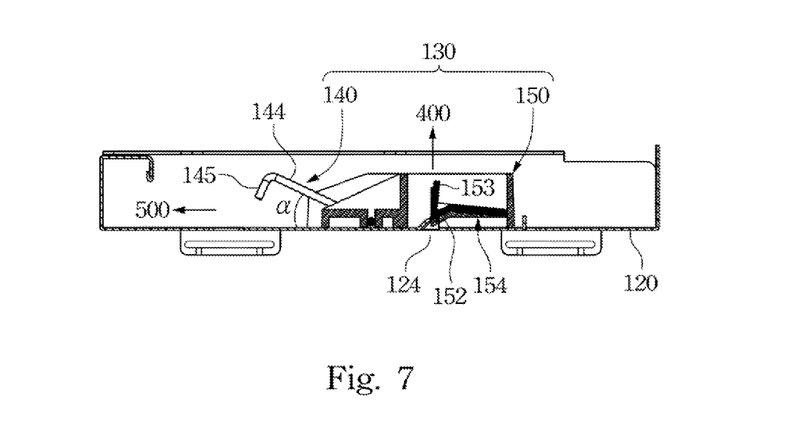
FIG. 7 is a sectional view along the line AA' in FIG. 6.
Figure 8:
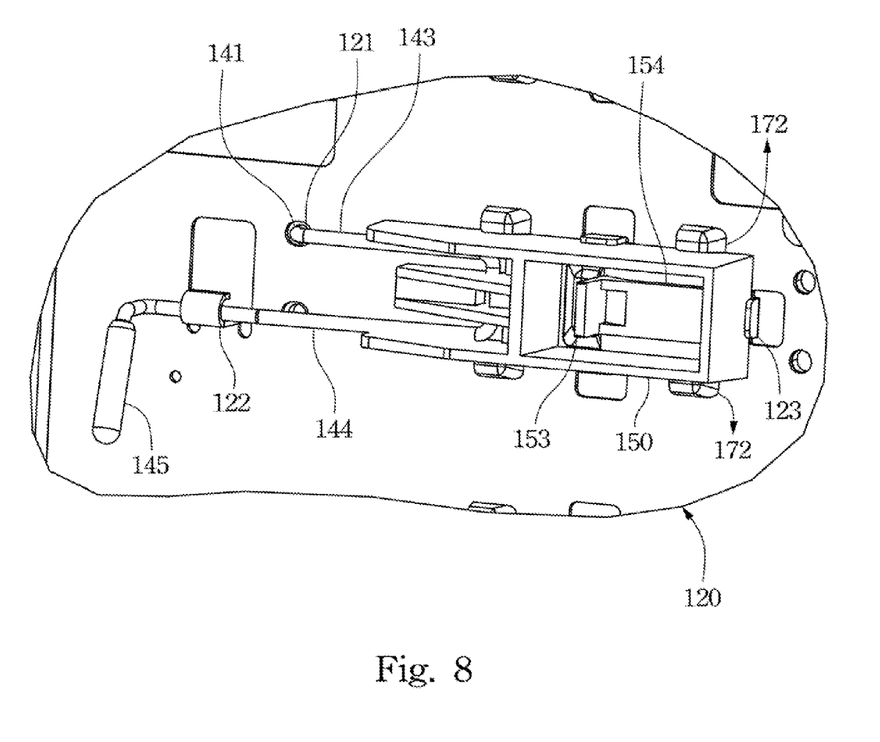
FIG. 8 is an embodiment of this invention, which shows that the second side segment 144 is pushed to the fixing portion 122.

FIG. 6 illustrates a top view which shows that the fixing module 130 is fixed on the second fixing board 120 and the fixing segment 141 is inserted through the hole 121 according to one embodiment of this invention. FIG. 7 is a sectional view along the line AA' in FIG. 6. Refer to FIG. 1, FIG. 6 and FIG. 7. When the fixing segment 141 is inserted into the fixing aperture 210 of the removable device 200 through the hole 121, an angle α is included between the second side segment 144 and the second fixing board 120. FIG. 8 is an embodiment of this invention, which shows that the second side segment 144 is pushed to the fixing portion 122. Since there is an included angle α between the second side segment 144 and the second fixing board 120, the second side segment 144 can be further pushed to the fixing portion 122 and held by the fixing portion 122, such that the second side segment 144 can be firmly fixed by the fixing portion 122.

A track structure can be utilized to fix the fixing module 130 on the second fixing board 120. Refer to FIG. 1, FIG. 4 and FIG. 5. The computer case may further include a track structure 170. Hence, the fixing module 130 can be inserted into the track structure 170 to fix the fixing module 130 on the second fixing board 120. The track structure 170 may include an emboss 171 disposed at the spring holder 150 and a track trough 172 disposed at the second fixing board 120. Hence, the emboss 171 disposed at the spring holder 120 can be inserted into the track trough 172 to fix the fixing module 130 on the second fixing board 120. In addition, the second fixing board 120 may further include a stopper 123. After the fixing module 130 is inserted into the track structure 170, the stopper 123 stops the fixing module 130.

Refer to FIG. 5 and FIG. 7. The spring holder 150 may further include a positioning emboss 152, and the second fixing board 120 may further include a positioning trough 124. When the fixing module 130 is inserted into the track structure 170 to a preset location, the positioning emboss 152 is engaged with the positioning trough 124, such that the fixing module 130 is positioned at the preset location. The positioning emboss 152 may include a handle portion 153. The positioning emboss 152 can be moved with the handle portion 153. The positioning emboss 152 may be connected with the spring holder 150 of the fixing module 130 by a flexible material 154. Hence, after the second side segment 144 of the U-shaped spring 140 is removed from the fixing portion 122, the positioning emboss 142 can be pulled out of the positioning trough 124 by pulling the handle portion 153 along the direction of the arrow 400, and the fixing module 130 can be flipped out of the track structure 170 to remove the fixing module 130 from the second fixing board along the direction of the arrow 500.

Above all, a removable device can be fixed by inserting the fixing segment of the U-shaped spring into the fixing aperture of the removable device through the hole of the fixing board. In addition, the removable device can be removed by removing the fixing segment of the U-shaped spring from the fixing aperture of the removable device through the hole of the fixing board. Therefore, the removable device can be fixed or removed without any tools. Besides, the spring holder can be removed after the positioning emboss of the spring holder is pulled out of the positioning trough of the fixing board. Hence, the spring holder can be fixed or removed without any tools.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit icy of the invention. In view of the foregoing, it is intended that the present invention cover modifications and variations of this invention provided they fall within the scope of the following claims.

What is claimed is:

1. A computer case, comprising:
   a first fixing board;
   a second fixing board, wherein a space for inserting a removable device is formed by the first fixing board and the second fixing board, the removable device comprises a fixing aperture, the second fixing board comprises:
      a hole, wherein the hole of the second fixing board can be aligned with the fixing aperture of the removable device when the removable device is inserted into the space; and
   a fixing module, comprising:
      a U-shaped spring, wherein a fixing segment is disposed at one end of the U-shaped spring; and
      a spring holder, comprising:
         a spring trough, wherein the fixing segment can be moved with rotating of the U-shaped spring in the spring trough to be inserted into or removed from the fixing aperture of the removable device through the hole when the U-shaped spring is placed in the spring trough of the spring holder and the fixing module is fixed on the second fixing board.

2. The computer case of claim 1, wherein the other end of the U-shaped spring comprises:
   a handle segment, wherein the U-shaped spring rotated in the spring trough with the movement of the handle segment.

3. The computer case of claim 1, wherein the second fixing board further comprises:
   a fixing portion, fixing the U-shaped spring after the fixing segment inserted into the fixing aperture through the hole.

4. The computer case of claim 3, wherein the U-shaped spring further comprises:

an axle segment to be placed in the spring trough;
a first side segment, wherein the fixing segment is disposed at the end of the first side segment, and when the axle segment is put in the spring trough and the fixing module is fixed on the second fixing board, the rotation of the axle segment in the spring trough drives the movement of the fixing segment, so that the fixing segment is inserted into or removed from the fixing aperture of the removable device through the hole; and
a second side segment, wherein the first side segment and the second side segment are disposed at two sides of the axle segment, and when the fixing segment is inserted into the fixing aperture of the removable device through the hole, an angle is included in between the second side segment and the second fixing board and the second side segment, and the second side segment can be further pushed to the fixing portion and held by the fixing portion, such that the second side segment can be fixed by the fixing portion.

5. The computer case of claim 1, further comprising:
a track structure, wherein the fixing module can be inserted into the track structure to fix the fixing module on the second fixing board.

6. The computer case of claim 5, wherein the second fixing board further comprising:
a stopper, stopping the fixing module after the fixing module is inserted into the track structure.

7. The computer case of claim 5, wherein the spring holder further comprises a positioning emboss, the second fixing board further comprises a positioning trough,
wherein the positioning emboss is engaged with the positioning trough when the fixing module is inserted into the track structure to a preset location, such that the fixing module is positioned at the preset location.

8. The computer case of claim 7, wherein the positioning emboss further comprises:
a handle portion, wherein the positioning emboss is moved with the handle portion.

9. The computer case of claim 7, wherein the positioning emboss is connected with the fixing module by a flexible material.

10. The computer case of claim 5, wherein the track structure comprises:
an emboss disposed at the spring holder; and
a track trough disposed at the second fixing board,
wherein the emboss disposed at the spring holder can be inserted into the track trough to fix the fixing module on the second fixing board.

* * * * *